Jan. 20, 1948.      J. P. AMADOR      2,434,633
MICROMETER CALIPER
Filed Aug. 31, 1944      2 Sheets-Sheet 1
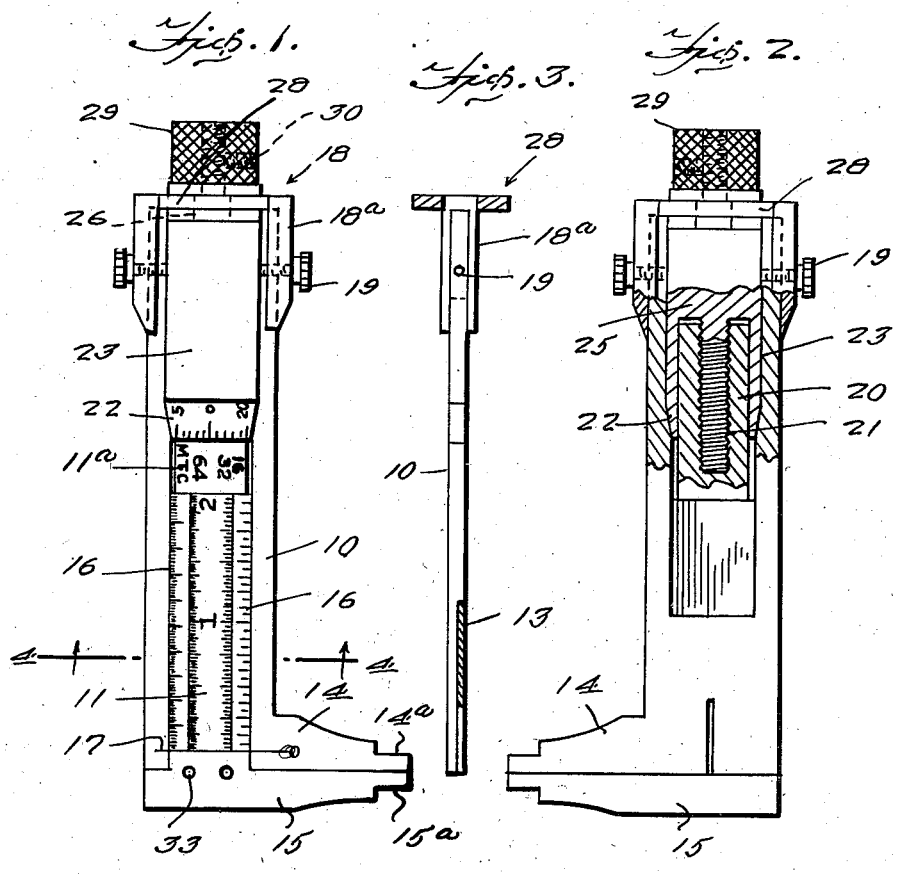
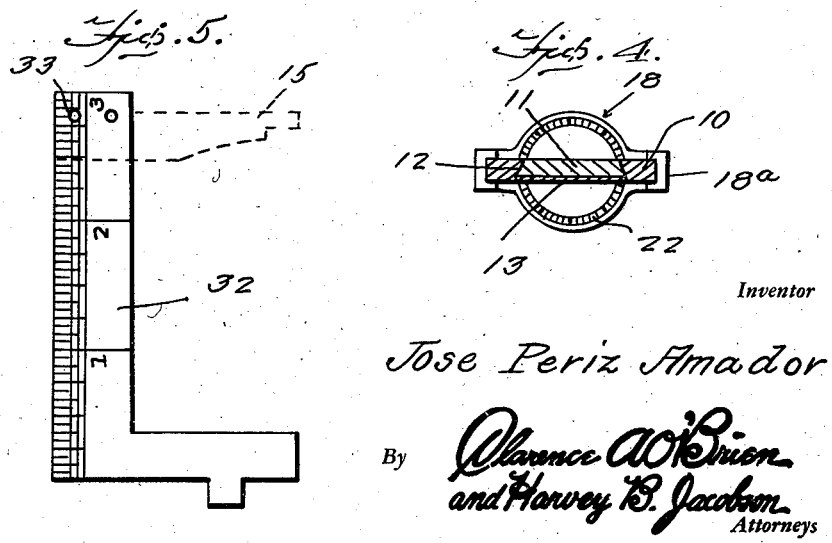
Inventor
Jose Periz Amador
By Clarence A. O'Brien
and Harvey B. Jacobson
Attorneys

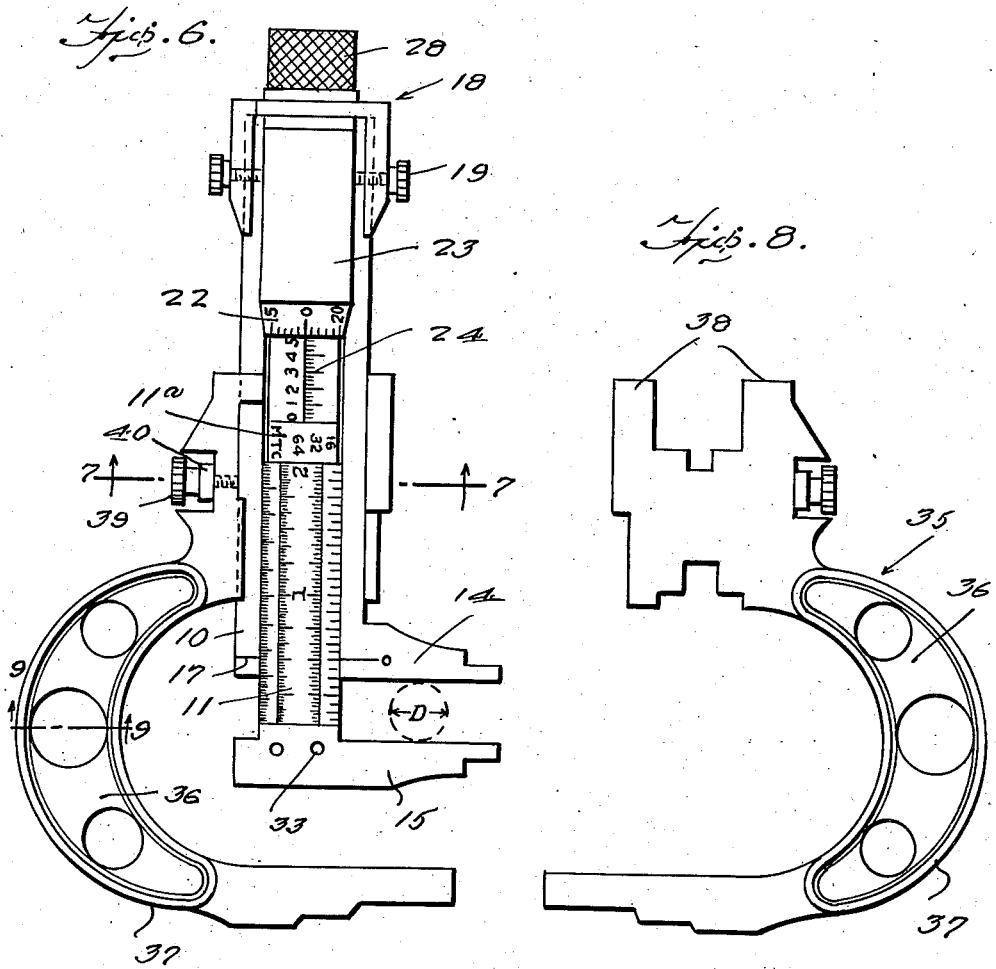
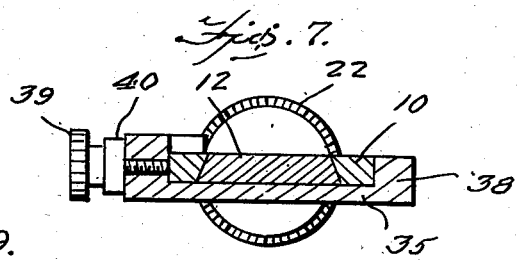
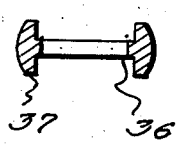

Patented Jan. 20, 1948

2,434,633

UNITED STATES PATENT OFFICE 2,434,633

MICROMETER CALIPER

Jose Periz Amador, Newark, N. J.

Application August 31, 1944, Serial No. 552,032

4 Claims. (Cl. 33—164)

This invention relates to a measuring instrument for reading thousandths of an inch of thicknesses as well as interior and exterior diameters of objects. In other words, this invention consists of a micrometer caliper particularly suitable for such purposes, namely, the reading of minute measurements.

An embodiment of this invention is illustrated in the accompanying drawings, wherein similar reference characters refer to the same parts in different views, and wherein:

Figure 1 represents a right side elevation of the instrument closed.

Figure 2 is a left side elevation and part section of the instrument closed.

Figure 3 is an end elevation and part section of the instrument, with the interior movable parts removed.

Figure 4 is a cross section on line 4—4 of Figure 1.

Figure 5 is an extension scale for use in taking larger measurements.

Figure 6 is a side elevation of the instrument of Figure 1 attached to a handle or adapter.

Figure 7 is a cross section of Figure 6 on line 7—7.

Figure 8 is an elevation of the adapter as seen from the reverse side to Figure 6, and Figure 9 is a section along line 9—9 of Figure 6.

Referring first to Figures 1 to 4, illustrating the principal parts of the invention, reference numeral 10 represents an elongated frame open at one end in which a slide 11 is guided for longitudinal displacement. For this purpose their edges are beveled, as at 12, in Figure 4, and a thin portion 13 connects the right and left sides of the frame to provide sufficient rigidity and keep the slide in position.

On the right side, Figure 1, is shown a pair of flat parallel faced jaws 14, 15 of which the upper one 14 forms part of the frame 10, while the lower one 15 is part of the slide 11 and between which jaws the object D to be measured is calipered between said flat faces on the jaws in the usual manner and read off from one of the several scales 16, metric and inches with decimals or fractions thereof furnished along the edges of the slide 11, against the zero line 17 on the frame 10, the characters of the scales being indicated at 11a at the top of the slide 11.

To caliper small interior diameters of a tube, a pair of bits 14a, 15a are provided at the outer ends of the jaws as usual.

The upper end of the frame 10 is provided with a yoke or crown 18 bridging the opening between the two sides of the frame with its flat middle portion 28 and extending downwardly with the U-sectional shanks 18a a short distance along the frames. The yoke is firmly but removably secured on the frame by a pair of screws 19.

At the upper end of the flat slide 11 is a cylindrical head 20 containing part of the micrometer or precision measuring elements of this instrument. This head, shown in part section in Figure 2, is permanently secured, as at 11a, to the end of the slide or scale proper 11. The head 20 has a central, threaded bore engaging the micrometer screw 21 preferably having a pitch of $1/40$ of an inch in order to make 0.001 inch readings on the vernier 22 divided into 25 equal spaces at the edge of thimble 23 as read off against an inch scale 24 divided into tenths and fortieths, see Fig. 6. This scale 24 is not visible, when the instrument is set at zero.

The thimble or skirt 23 and the screw 21 constitute parts of the actuating, cylindrical body 25 mounted to turn on the axis of the frame 10. It abuts with its flat top face against the crown or yoke 18 through the intermediary of a thrust bearing 26. Both of these bearings are anti-friction bearings of the usual ball or roller type. On the upper side of the yoke 18 is placed another thrust bearing 27 and the cylindrical body has an axial pin 30 threaded to engage the knurled actuating button 29 which is held firmly in set position without axial play on the pin 30. It will thus be seen that parts 21, 23, 25 will all turn together to cause the slide 11 with its head 20 to be axially displaced without turning so that the coarse readings of a calibration may be read off on one of the scales 16 against the zero mark at 17.

It will also be understood that the micrometer readings will be made with the aid of the decimal scale 24 and the vernier 22 in the usual manner.

If at any time diameters of more than three inches for which slide 11 is marked, is to be read an extension scale 32 is provided for temporary attachment at the lower end of slide 11, for which purpose holes 33 are indicated.

In Figures 6, 7 and 8 is shown an adapter or handle 35 for a more convenient use of the instrument, particularly for larger diameters of shafts, bars or axles. This adapter consists of an arcuate grip 36 preferably of I-shaped cross section with rounded outer surfaces, as at 37, to provide a comfortable hold and with transverse holes for lightness.

The upper end of the adapter 35 is provided with side ledges 38 spaced to fit the width of the frame 11 which is held firmly therein by a set screw 39 secured by a lock nut 40. The use of the instrument with the adapter 35 is the same as stated, with regard to Figures 1 to 4, and an example is indicated in Figure 6, wherein an object D is inserted between the jaws 14, 15.

It is understood that the invention as here disclosed is not limited to the details here described and shown, but that the same may be varied widely without departing from the spirit of the invention as defined by the subjoined claims.

I claim:

1. A micrometer caliper comprising a frame member having a pair of parallel legs, a yoke detachably secured to the free ends of said legs and having a central aperture therein, said frame and legs defining a slot, one end of said slot being enlarged, bevelled edges on said parallel legs, a slide positioned in said slot and engaging said bevelled edges, jaws projecting from said slide and a side of said frame, set screws secured to said yoke engaging said legs, means for regulating the distance between said jaws, said means including a drum having a bevelled skirt, a bevelled portion connecting said enlargement in said slot and receiving said bevelled skirt, a head adjustably received in said drum having said slide secured thereto, means extending through said central aperture and secured to said drum for rotating said drum.

2. The combination of claim 1 and said last-mentioned means including a threaded stud having a knob detachably associated therewith.

3. The combination of claim 2 and thrust bearings on said stud engaging said yoke.

4. The combination of claim 3 and an arcuate handle detachably secured to said legs and selectively positioned longitudinally on said legs.

JOSE PERIZ AMADOR.

REFERENCES CITED

The following references are of record in the file of this patent:

UNITED STATES PATENTS

| Number | Name | Date |
|---|---|---|
| 517,208 | Billings | Mar. 27, 1894 |
| 552,659 | Brown | Jan. 7, 1896 |
| 933,309 | Keeter | Sept. 7, 1909 |
| 1,477,533 | Blood | Dec. 18, 1923 |